Patented Nov. 4, 1952

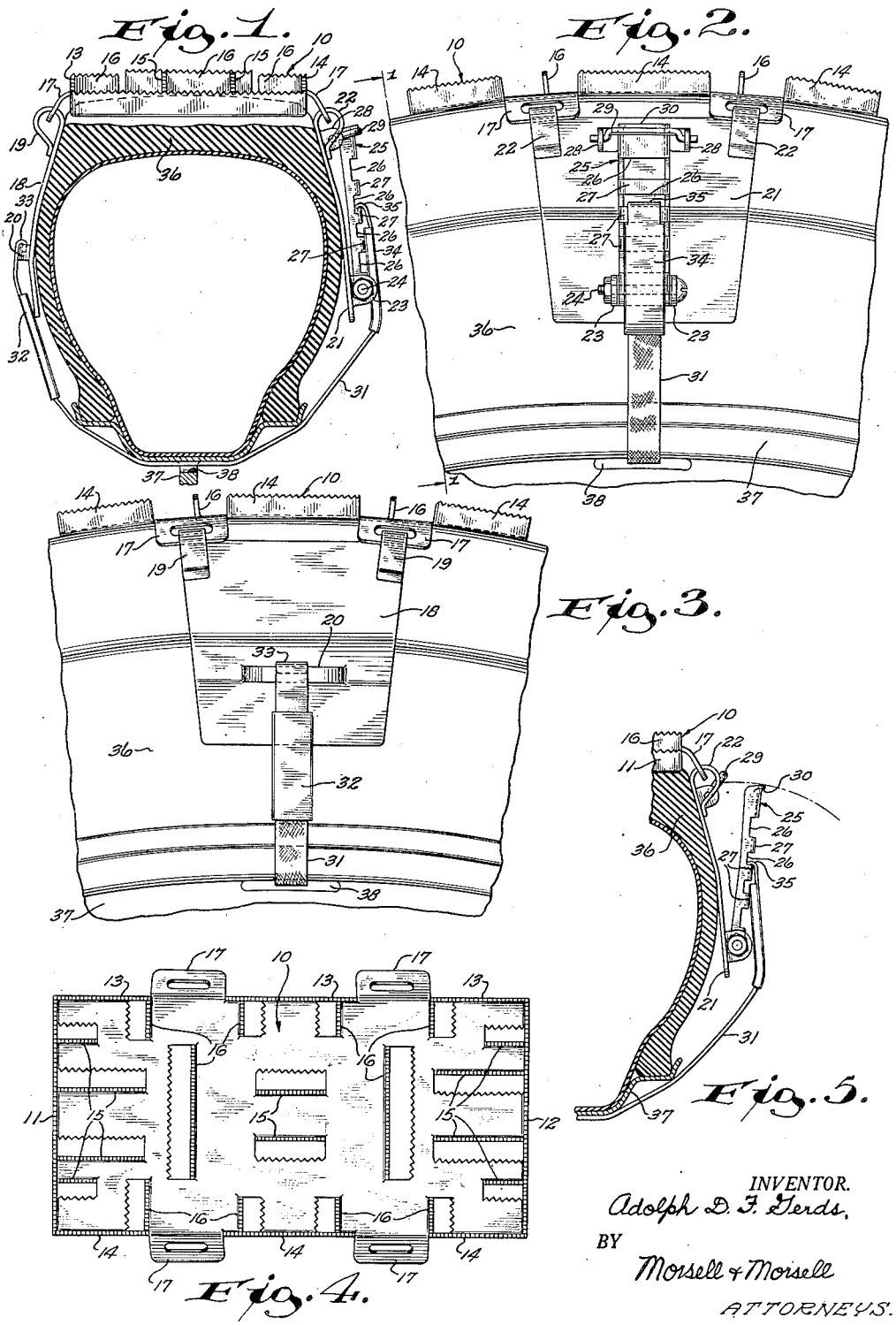

2,616,476

UNITED STATES PATENT OFFICE 2,616,476

TRACTION DEVICE FOR VEHICLE TIRES

Adolph D. F. Gerds, Milwaukee, Wis.

Application July 17, 1950, Serial No. 174,271

6 Claims. (Cl. 152—228)

This invention relates to improvements in traction devices for vehicle tires.

The most common type of removable traction devices presently used on vehicle tires are chains. These usually take one of two forms, the first being the type which completely encircles the circumference of the tire. The second form of chain is the smaller type which encircles the transverse periphery of the tire only, and is held onto the tire by a web band which extends around the rim and is fastened by being passed through a buckle.

The first type of chain is inconvenient to handle and is very difficult to install on a tire, particularly in cold weather. The vehicle tires, must either be jacked up to permit the placement of the chains thereunder, or else said tires must be run onto the chains which have previously been stretched out on the roadbed. The ends of said chains must then be pulled up around the tires and fastened together by means of connecting links which are frequently rusted and difficult to manipulate. This operation is rendered especially difficult by the design of modern fenders which limit access to the tires.

Application of the second form of chain to a tire is also difficult, especially in cold weather, due to the fact that the web straps become stiff and cannot be readily passed through or tightened in the fastening buckle. In addition, it is difficult to pass the web strap around the tire and through the wheel from the inner side outwardly without special tools.

With the above in mind, a principal object of the present invention is to provide an improved removable traction device for vehicle tires which can be readily attached to or removed from a tire regardless of weather conditions.

A further object of the invention is to provide an improved removable traction device for vehicle tires having the advantages of the strap-on type of chain unit, but which does not require the fastening of a strap to a buckle in order to attach said device to a tire.

A further more specific object of the invention is to provide an improved device of the class described having embodied therein a flexible attaching band provided with connection means at each end, said band cooperating with a toggle member on said device to provide means for quickly and positively tightening said band during the attachment of said device to a tire.

Another specific object of the invention is to provide an improved traction device of the class described comprising a traction plate having irregular ground engaging surfaces and a pair of side plates pivotally connected thereto, said side plates, when the device is in operative position on a tire, being interconnected by means of the flexible connecting band; one of said side plates being provided with the toggle member and the other of said plates being formed with a loop, one of the hooked ends of the flexible band being connected to said loop and the other of said hooked ends being connected to said toggle member.

A further object of the invention is to provide an improved device of the class described having a traction member provided with outwardly projecting longitudinal and transverse ground engaging flanges which substantially preclude slippage in any direction.

A further object of the invention is to provide an improved device of the class described which is adapted for use on various sizes of tires, which can be folded for compact storage, which is simple in construction and inexpensive to manufacture, and which is otherwise well adapted for the purposes described.

With the above and other objects in view, the invention consists of the improved traction device for vehicle tires and all of its parts and combinations as set forth in the claims, and all equivalents thereof.

In the drawing accompanying and forming a part of this specification, wherein is shown one complete embodiment of the preferred form of the invention, and wherein like characters of reference indicate the same parts in all the views:

Fig. 1 is a transverse vertical sectional view taken through a tire having the improved traction device in operative position thereon, said traction device being shown in end view as indicated by the line 1—1 of Fig. 2;

Fig. 2 is a fragmentary elevational view of the right side of the improved traction device and the tire of Fig. 1;

Fig. 3 is a fragmentary elevational view similar to Fig. 2 and showing the left side of the improved traction device and the tire of Fig. 1;

Fig. 4 is a plan view of the ground engaging traction plate of the improved device; and Fig. 5 is a fragmentary transverse vertical sectional view similar to Fig. 1 showing the toggle member in outwardly swung position.

Referring more particularly to the drawing, numeral 10 indicates the road engaging member of the improved traction device. In the preferred embodiment this road engaging member takes the form of a rectangular metal plate, as shown in the drawing. This road engaging member may, however, take other forms within the concept of the invention. The plate 10 is preferably curved in longitudinal cross section to conform to the circumferential curvature of a tire. The plate 10 is preferably formed with a plurality of outwardly projecting flanges having serrated edges, as shown. Referring to Fig. 4, the plate 10 is shown formed with end flanges 11 and 12, side wall flanges 13 and 14, longitudinally extending flanges 15, and transverse flanges 16. The plate 10 is formed at each side with a pair of spaced slotted ears 17.

Referring to Figs. 1 and 3, an arcuate, generally rectangular side plate 18 is formed along one edge with a pair of spaced ears 19, each of which extends loosely through the slot of one of the ears 17 of the plate 10. The ears 19 are bent to form a closed loop with the plate 18, as shown, the ends of said ears preferably being spot welded or otherwise fixed to the plate 18. The plate 18 is also formed with a handle shaped loop or shoulder member 20 which may be formed thereon by stamping.

Referring to Figs. 1 and 2, a side plate 21, resembling the side plate 18, is formed along its upper edge with a pair of ears 22, similar to the ears 19. The ears 22 of the plate 21 extend loosely through the slotted ears 17 on the opposite side of the plate 10 from the plate 18, the ears 22 being formed similarly to the ears 19 into closed loops, and preferably having their ends welded or otherwise fixed to the plate 21. The plate 21 is formed adjacent its lower end with a pair of outwardly projecting apertured lugs 23 in which is mounted a pivot bolt or pin 24. The pin 24 is spaced from and is parallel with the plate 21. Pivotally mounted at one end on the pivot pin 24, for swinging movement in a transverse plane, is a toggle member 25 which is preferably channel shaped in cross section. The toggle member 25 is preferably formed with a plurality of transverse slots 26 to provide a plurality of transverse bars or shoulders 27 therebetween.

Adjacent its upper edge the plate 21 is formed with a pair of spaced outwardly projecting apertured ears 28 in which is pivotally mounted a generally U-shaped locking member 29. The locking member 29 is positioned so that it can be swung into locking position over the end of the toggle member 25 (as shown in Figs. 1 and 2) when said toggle member is swung against the plate 21. As shown in Fig. 5, the locking member 29 can be swung upwardly to release the toggle member 25 when desired. The outer end of the toggle member 25 is preferably flared outwardly slightly, as shown at 30 in Fig. 5, so that it is necessary to apply a slight inward force on the end of the toggle member in order for the locking member to snap thereover. This prevents inadvertent release of the locking member and provides a better locking action.

A flexible connecting band 31, which may be of web material or any other suitable material, is provided at one end with an elongated metal connection member 32 having a hook shaped terminus 33 which is adapted to be readily removably engaged with the handle shaped loop 20 of the plate 18. The other end of the flexible connecting band 31 is provided with a metal connection member 34 having a hook shaped terminus 35 which is adapted to be readily removably engaged with one of the bars or shoulders 27 of the toggle member 25.

To install the improved traction device on a tire, such as the tire 36 mounted on a wheel 37, the traction plate 10 is placed on the road engaging surface of the tire, as shown in Figs. 1 to 3, with the side plate 18 in contact with the inner side wall of the tire 36 and with the side plate 21 in engagement with the outer side wall of the tire. The connection member 32 on the band 31 is then inserted through the aperture 38 in the wheel 37 and hooked onto the loop 20 formed on the side wall 18, as shown in Figs. 1 and 3. The locking member 29 is swung upwardly to release the toggle member 25, and said toggle member is swung outwardly, as shown in Fig. 5. The hooked end 35 of the band 31 is engaged in one of the slots 26 of the toggle member 25 when the latter is in outwardly swung position, and said toggle member is then swung inwardly to the position shown in Figs. 1 and 2. As the toggle member is swung inwardly, it tightens the connecting band 31, thereby securely fastening the improved traction device to the tire 36 and wheel 37. The locking member 29 is then snapped down over the end 30 of the toggle member 25 to lock said toggle member in operative position.

When the improved device is used on a tire, the serrated edges of the ground engaging flanges 13 to 16 dig into the roadbed and provide positive traction for the tire to which the device is attached. The transverse and longitudinal disposition of the flanges 13 to 16 effectively prevents slippage in any direction.

The improved traction device will remain firmly attached to the tire 36 and wheel 37 until removed by an operation which is the reverse of the attaching operation just described. It will be noted that the connections of the band 31 to the side plates 18 and 21 are easily and quickly made by means of the hooked ends 33 and 35 with the loop 20 and bars 27 respectively. There are no buckles or other attachments which are difficult to manipulate in cold weather. The improved device is light in weight, and, when not in use, the plates 18 and 21 thereof can be folded inwardly against the plate 10 for compact storage.

Various changes and modifications may be made without departing from the spirit of the invention, and all of such changes are contemplated as may come within the scope of the claims.

What I claim is:

1. In a traction device having a ground engaging traction member adapted to be positioned on the wearing surface of a tire: a first side plate connected to a side portion of said traction member and adapted to be positioned against one sidewall of said tire, said side plate being formed with a shoulder adjacent said sidewall; a second side plate connected to an opposite side portion of said traction member and adapted to be positioned against the opposite sidewall of said tire; a toggle member swingably mounted on said second side plate adjacent said opposite sidewall and having formed thereon at least one shoulder; and a flexible connection member formed at one end with means for removably connecting said member to the shoulder on said first side plate, said connection member being formed at its other end with means for removably connecting said member to a shoulder of said toggle member, and said connection member having an intermediate portion extending radially inwardly of the beads of said tire.

2. In a traction device having a ground engaging traction member adapted to be positioned on the wearing surface of a tire: a first side plate connected to a side portion of said traction member and adapted to be positioned against one sidewall of said tire, said side plate being formed with a shoulder adjacent said sidewall; a second side plate connected to an opposite side portion of said traction member and adapted to be positioned against the opposite sidewall of said tire; a toggle member swingably mounted on said second side plate adjacent said opposite sidewall and having formed thereon at least one shoulder; and a flexible band formed at one end with a hook shaped portion removably engaging the shoulder on said first side plate, said band being formed at its other end with a hook-shaped portion removably engaging a shoulder of said toggle member, and said band having an intermediate portion extending radially inwardly of the beads of said tire.

3. In a traction device having a ground engaging traction member adapted to be positioned on the wearing surface of a tire: a first side plate connected to a side portion of said traction member and adapted to be positioned against one sidewall of said tire, said side plate being formed adjacent said sidewall with a shoulder; a second side plate connected to an opposite side portion of said traction member and adapted to be positioned against the opposite sidewall of said tire; a toggle member swingably mounted on said second side plate adjacent said opposite sidewall and having formed thereon a plurality of radially spaced shoulders; and a flexible band formed at one end with a hook-shaped portion removably engaging the shoulder on said first side plate, said band being formed at its other end with a hook-shaped portion removably engaging a selected shoulder of said toggle member, and said band having an intermediate portion extending radially inwardly of the beads of said tire.

4. In a traction device having a ground engaging traction member adapted to be positioned on the wearing surface of a tire: a first side plate connected to a side portion of said traction member and adapted to be positioned against one sidewall of said tire, said side plate being formed adjacent said sidewall with a shoulder; a second side plate connected to an opposite side portion of said traction member and adapted to be positioned against the opposite sidewall of said tire; a toggle member swingably mounted on said second side plate adjacent said opposite sidewall for movement in one plane only with respect to said plate and having formed thereon at least one shoulder; a flexible band formed at one end with a hook-shaped portion removably engaging the shoulder on said first side plate, said band being formed at its other end with a hook-shaped portion removably engaging a shoulder of said toggle member; and a generally U-shaped locking member pivotally mounted on said second side plate for movement coplanar with said toggle member and adapted to be snapped over an end portion of said toggle member when the latter is in operative position to lock the toggle member in said position.

5. In a traction device having a ground engaging traction member adapted to be positioned on the wearing surface of a tire: a first side plate connected to a side portion of said traction member and adapted to be positioned against one sidewall of said tire, said side plate being formed with a shoulder adjacent said sidewall; a second side plate connected to an opposite side portion of said traction member and adapted to be positioned against the opposite sidewall of said tire; a toggle member swingably mounted on said second side plate adjacent said opposite sidewall and having formed thereon at least one shoulder; a flexible strap formed at one end with a rigid elongated hook-shaped member removably engaging the shoulder on said first side plate, said strap being formed at its other end with a rigid hook-shaped member removably engaging a shoulder of said toggle member, and said strap having an intermediate portion extending radially inwardly of the beads of said tire.

6. In a traction device having a ground engaging traction member adapted to be positioned on the wearing surface of a tire: a first side plate connected to a side portion of said traction member and adapted to be positioned against one sidewall of said tire, said side plate being formed with a shoulder adjacent said sidewall; a second side plate connected to an opposite side portion of said traction member and adapted to be positioned against the opposite sidewall of said tire; a toggle member swingably mounted on said second side plate adjacent said opposite sidewall, said toggle member being formed with a plurality of radially spaced shoulders; and a flexible web strap formed at one end with a rigid elongated hook member removably engaging the shoulder on said first side plate, said strap being formed at its other end with a rigid hook member removably engaging a selected shoulder of said toggle member, and said strap also having an intermediate portion extending radially inwardly of the beads of said tire.

ADOLPH D. F. GERDS.

REFERENCES CITED

The following references are of record in the file of this patent:

UNITED STATES PATENTS

| Number | Name | Date |
|---|---|---|
| 1,053,893 | Walter | Feb. 18, 1913 |
| 2,174,345 | Worthing | Sept. 26, 1939 |
| 2,461,737 | Huffman | Feb. 15, 1949 |